W. C. LOWE.
DEVICE FOR TEACHING PENMANSHIP.
APPLICATION FILED MAR. 7, 1921.
1,416,564. Patented May 16, 1922.
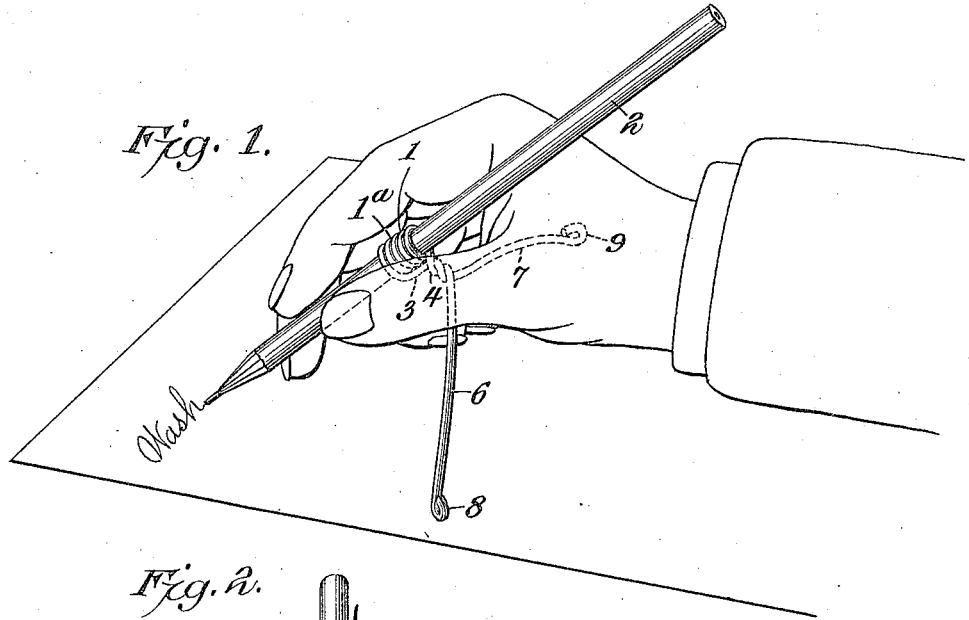
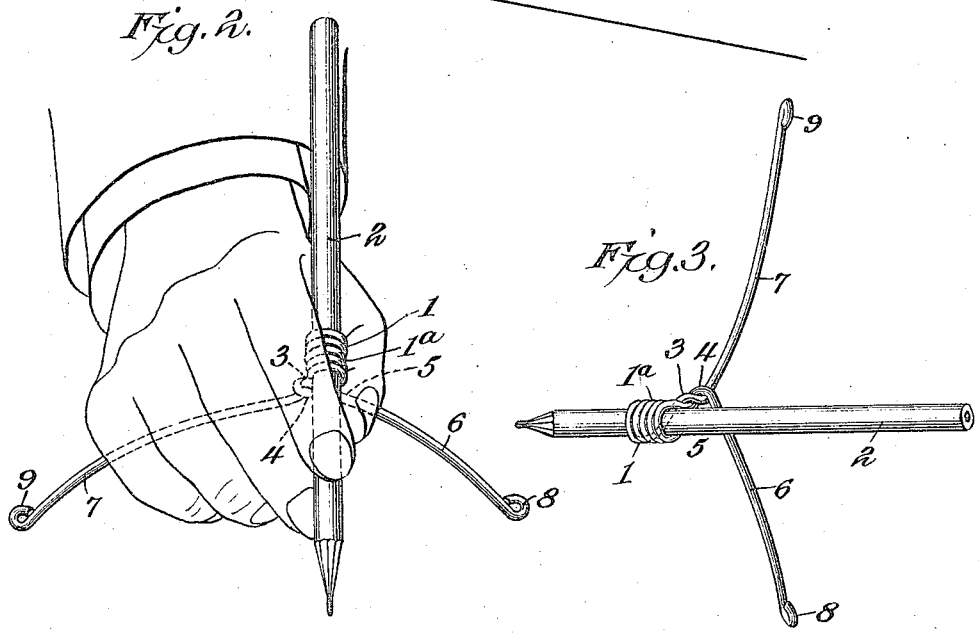
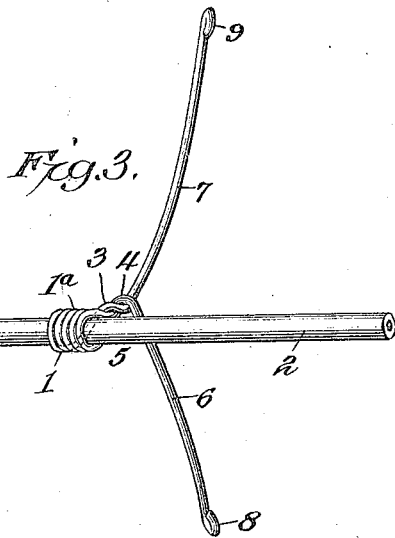
WITNESSES
C. C. Ratcliff.
Howard D. Orr.
W. C. Lowe, INVENTOR,
BY E. G. Siggers
ATTORNEY

UNITED STATES PATENT OFFICE.

WILLIAM C. LOWE, OF ATLANTA, GEORGIA.

DEVICE FOR TEACHING PENMANSHIP.

1,416,564.  Specification of Letters Patent.  Patented May 16, 1922.

Application filed March 7, 1921. Serial No. 450,223.

*To all whom it may concern:*

Be it known that I, WILLIAM C. LOWE, a citizen of the United States, residing at Atlanta, in the county of Fulton and State of Georgia, have invented a new and useful Device for Teaching Penmanship, of which the following is a specification.

This invention relates to devices for teaching penmanship.

The object is to provide a device, simple in construction and cheaply manufactured, which may be readily applied to a pen or pencil in proper position to fit the hand of the user and support the said pen or pencil in the correct angular relation to the writing surface, without interfering with the free movement of the hand while forming the letters or characters, the effect of the device in use being to cause the action of the muscles of the arm to be brought to bear and to effectually prevent the leaning of the hand on the side and resting the wrist upon the writing surface.

Another object is to provide a device for attachment to any writing implement which, when properly applied, provides, in conjunction with the pen or pencil point, a three-point bearing upon the writing surface, thus constituting a self-supporting stand so formed as to be readily slidable in any direction over the surface to form letters or characters, the parts of the device being so constructed and shaped as not to interfere in the least with the fingers in assuming the natural and accepted positions to properly grasp the pen or pencil.

A full and complete understanding of the invention may be obtained from a consideration of the following detailed description, taken in connection with the accompanying drawing forming a part of this specification; it being understood that while the drawing shows a practical form of the invention, the latter is not confined to strict conformity therewith, but may be changed and modified, so long as such changes and modifications mark no material departure from the salient features of the invention, as specifically pointed out in the appended claims.

In the drawing, in which similar reference characters designate corresponding parts throughout the several figures:—

Figure 1 is a perspective view taken from the side and showing the device applied to a pencil and grasped in proper position by the hand of a writer;

Figure 2 is a perspective view of the same, as viewed from the front;

Figure 3 is a top plan view of the device, applied to a pencil;

Figure 4 is a detail section of the pencil-engaging portion of the device.

Great difficulty has been experienced with young school children especially the beginners, in endeavoring to instill in them the principles and rules of penmanship, and to correct the almost invariable tendency to lean the hand over toward the outside to rest the wrist upon the paper or writing surface, and to produce the necessary up and down strokes solely by a movement of the fingers with the writing implement leaning at an awkward and unnatural angle. This wrong method fails to produce the desired full, round strokes and quickly results in tired, cramped hands which renders more difficult the task of both learning and teaching the art of beautiful and correct penmanship.

The device of the present invention aims to render it impossible to grasp the implement incorrectly and to prevent the leaning of the hand and the manipulation of the writing implement by a finger movement alone, and causes the muscles of the arm to be brought into play, thus greatly facilitating the formation of more perfect characters and permitting of continued easy operations in writing.

To this end the invention comprises a pen or pencil support formed preferably of a single length of spring steel wire having means for clamping the pen or pencil at any desired point, depending on the size of the hand of the writer, and having outstanding arms or legs provided with feet or rounded extremities for sliding movement over the writing surface, the said feet, together with the pen or pencil point, by reason of their triangular relation where resting upon the surface, constituting a three-point bearing or contact for supporting the pencil in the proper position for writing and to maintain such position, if desired, even when not grasped by the hand of the writer.

The length of wire is bent at an intermediate point of its length into a coiled tube 1 of preferably five strands, as desired, the said coil having an internal diameter to snugly fit the average pencil 2, one of the coils 1ª being forced out of alinement with the other coils, as shown in Fig. 4, so as to bind the penholder or pencil with sufficient friction to prevent its accidental movement, either rotary or longitudinally thereon. This coiled tube must consist of a sufficient number of coils as to be long enough to prevent any wabbling action also, and one portion of the wire is then brought beneath the tube and to the rear thereof, as indicated at 3, where it is twisted around the other portion 4, said twisted portion constituting an offset arm extending somewhat to one side, as to the right, to provide a space 5 for the thumb of the writer as clearly illustrated in Figs. 1 and 2 of the drawing.

The terminal leg portion 6 of the free end 4 and the terminal leg portion 7 of the free end 3 are then bowed outwardly and rearwardly ending in return bends 8 and 9, respectively, comprising feet to rest upon the paper or other writing surface and to freely slide thereover while the device is being operated, and serving at all times to maintain the writing implement in the proper rearwardly inclined position.

It will be observed that the leg member 7 is somewhat longer than the leg member 6 and that it extends beneath the palm of the hand and through the partially clinched fingers thereof when properly grasped with the tips of the last two fingers in position to slide over the surface, and that ample accommodation for the thumb is provided by the aforesaid space 5 which allows the thumb and forefinger to grasp the implement in a natural manner, with the second finger extending along one side and below the implement as is customary.

From the foregoing, it will be seen that an extremely simple device has been provided, formed of a minimum amount of material and that the same may be manufactured and sold at a low cost to be within the reach of school children, and that the same may be easily applied to or removed from a pen or pencil, or adjusted thereon to the desired location to support the same at the proper angular position and thereby facilitate in the instruction of beginners and others to acquire the art of fine penmanship.

What is claimed is:—

1. A device for teaching penmanship to be used with a pen or pencil, comprising an element to fit upon the pen or pencil and be retained thereon, and a pair of arms extending out from each side of said element adapted to support the hand of the writer and shaped at their ends to slide over the writing surface while writing, and forming with the pen or pencil a three-point bearing or contact with said surface.

2. A device for teaching penmanship to be used with a pen or pencil, comprising a tubular element to slip over the pen or pencil and be retained thereon, and a pair of arms extending out from each side of said element and bowed outwardly and rearwardly and having rounded extremities to slide over the writing surface while writing, thereby forming with the pen or pencil a three-point bearing or contact with said surface, said arms being adapted to support the hand of the writer.

3. A device for teaching penmanship to be used with a pen or pencil, comprising a coil tube to frictionally engage the pen or pencil and be retained thereon, an offset arm extending from the tube at one side, and a pair of legs extending from the offset arm, one leg extending beneath the pen or pencil to the left and the other leg extending away from the same to the right, the extremities of the legs being shaped to slide over the writing surface while writing, thereby providing a three-point bearing or contact with said surface, said legs being adapted to support the hand of the writer.

4. In a device for teaching penmanship for use with a pen or pencil, a coil tube adapted to adjustably engage the pen or pencil and having an offset arm extending to the rear and to one side thereof, said arm terminating in rearwardly and outwardly bowed legs having terminal feet to rest upon the writing surface and forming, together with the pen or pencil point, a three-point bearing to support the pen or pencil in the proper position for writing, said legs being adapted to support the hand of the writer.

In testimony, that I claim the foregoing as my own, I have hereto affixed my signature.

WILLIAM C. LOWE.